(12) United States Patent
Carreiro et al.

(10) Patent No.: US 6,737,185 B1
(45) Date of Patent: May 18, 2004

(54) SODIUM GALLIUM OXIDE ELECTROLYTE ADDITIVE FOR ALUMINUM ANODE ACTIVATION

(75) Inventors: Louis G. Carreiro, Westport, MA (US); Steven P. Tucker, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 216 days.

(21) Appl. No.: 10/006,734

(22) Filed: Nov. 30, 2001

(51) Int. Cl.[7] .................... H01M 8/08; H01M 12/08
(52) U.S. Cl. ................................. 429/29; 429/27
(58) Field of Search ................. 429/27, 218.1, 429/29

(56) References Cited

U.S. PATENT DOCUMENTS 4,322,483 A * 3/1982 Tune .................. 429/50
4,416,954 A * 11/1983 Zaromb ............... 429/15
5,413,881 A * 5/1995 Licht et al. ........... 429/105

OTHER PUBLICATIONS

Dow et al., "Enhanced electrochemical performance in the development of the aluminum/hydrogen peroxide semi–fuel cell", Journal of Power Sources (1997) 65(1–2) 207–212.*

* cited by examiner

*Primary Examiner*—Carol Chaney
(74) *Attorney, Agent, or Firm*—James M. Kasischke; Jean Paul A. Nasser; Michael F. Oglo

(57) ABSTRACT

An additive for an aluminum-based semi-fuel cell system includes a combination of components including gallium, oxygen, and a sodium component dissolvable an alkaline electrolyte solution such as seawater and sodium hydroxide. These components form sodium gallium oxide and prevent or reduce formation of an oxide layer on a surface of an aluminum anode in the alkaline electrolyte of the semi-fuel cell system.

14 Claims, No Drawings

SODIUM GALLIUM OXIDE ELECTROLYTE ADDITIVE FOR ALUMINUM ANODE ACTIVATION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable

BACKGROUND OF THE INVENTION (1) Field of the Invention

This invention generally relates to an electrolyte additive for aluminum anode activation.

More particularly, the invention relates to an electrolyte additive for aluminum anode activation in which the additive is sodium gallium oxide, the additive preventing or reducing the formation of an oxide coating on a surface of a metal.

(2) Description of the Prior Art

In the current art of aluminum based semi-fuel cells (Al-SFC), elemental aluminum (or one of its alloys) along with hydrogen peroxide, is consumed to produce energy. Among the more promising semi-fuel cells currently being considered as electrochemical sources is the aluminum/hydrogen peroxide cell. The type of aluminum used in the semi-fuel cell is dictated by the specific requirements of the application. Applications requiring high discharge rates (current densities above 1000 mA/cm$^2$), typically utilize aluminum-based alloys such as XA5-P and DF50V, while for low rate (current densities from 5–50 mA/cm$^2$) applications, EB50V is the aluminum alloy of choice.

All three proprietary alloys are formulated by ALCAN International; however, consideration of these alloys for further use is jeopardized by the following facts: (a) EB50V, XA5-P, and DF50V are proprietary alloys manufactured by a sole source, and (b) the present state of the economy (supply and demand) has forced the cost of these unique alloys to prohibitive and costly levels beyond acceptable acquisition levels. For these reasons, pure aluminum has been investigated as a replacement for the costly and difficult to acquire proprietary alloys.

The use of pure aluminum metal (especially in low rate semi-fuel cell systems) is hindered by the fact that aluminum readily oxidizes in a caustic electrolyte, thereby forming a passive surface layer that causes its chemical reactivity to greatly diminish, and adversely affecting the power output and efficiency of the semi-fuel cell. It was found by the inventors that an addition of gallium ions to the electrolyte solution prevents aluminum oxide formations, and hence eliminates the problem of passivity.

The use of electrolyte additives to modify the chemical reactively of aluminum metal and aluminum-based alloys used as anodes in semi-fuel cells has been previously investigated for high rate applications in each of the following publications:

*Enhanced Electrochemical Performance in the Development of the Aluminum/Hydrogen Peroxide Semi-Fuel Cell* by E. G. Dow et. al., Journal of Power Sources 65 (1997) pp. 207–212.

*Aluminum-Hydrogen Peroxide Battery Development: Part II—Anode Polarization of Pure Aluminum Via Electrolyte Additives*, Seebach et. al., Technical Memorandum of NAVAL UNDERWAEA WARFARE CENTER DIVISION NEWPORT, RHODE ISLAND, 15 Jun. 1992.

*Electrochemical Characterization of aluminym alloy EB50V: The Effect of Sodium Hydroxide Concentration, Aluminate Concentration, Stannate Concentration, and Temperature*, Medeiros et al., 18 Jan. 1993, Technical Memorandum of NAVAL UNDERWAEA WARFARE CENTER DIVISION NEWPORT, RHODE ISLAND.

For the most part, these studies utilized half-cell reaction experiments to obtain polarization data (i.e., current-voltage curves) that was correlated to changes in aluminum activity as a function of electrolyte additive Several electrolyte additives in the form of metal oxides were tested and it was found that gallium oxide yielded the best anodic voltage, −1.3 volts versus Af/AgCl at 400 MA/cm$^2$. However, since gallium oxide ($Ga_2O_3$) has limited solubility in caustic (seawater/sodium hydroxide) electrolytes typically used in aluminum based semi-fuel cells, it is difficult t,o quantify and/or control the effect that the gallium ion has on the electrochemical performance of aluminum, i.e. to determine the optimum gallium concentration required to prevent aluminum passivity. Accordingly, a need still exists in the art for a suitable additive having the desired properties.

The following patents, for example, discuss the prevention of corrosion by producing a protective oxide coating on the surface of a metal such as aluminum. However, these patents do not teach the prevention of formation of such a surface in the first place as does the present invention.

U.S. Pat. No. 3,347,155 to Weber;

U.S. Pat. No. 3,887,399 to Gunn; and

U.S. Pat. No. 6,030,517 to Lincot et al.

Specifically, Weber discloses a process of improving the corrosion resistance of aluminum articles that includes removing the impurities from the article surface, then chemically or electrolytically forming an artificial aluminum oxide coating, treating the artificially oxide coated article to a dilute aqueous solution of an inorganic base such as NaOH or KOH, and thereafter treating the article to an alkaline silicate solution. Advantageously intermediate the above mentioned treatments, the article is treated to one or more of aqueous solutions of (1) organic compounds having cations of various iron group metals and anions of acetates, citrates, oxalates, tartrates, (2) organic compounds of various alkali and alkali earth metals having anions of acetates, citrates, oxalates, (3) ammonium hydroxide, (4) ammonium compounds having an anion of such acetates, citrates, carbonates, and (5) various mixtures of the above.

The patent to Gunn discloses a multi-chambered incinerator having high temperature electric heater elements at one or more flame ports. The incinerator has a main combustion chamber followed by one or more additional chambers connected by one or more flame ports. In the flame port that may have checkerboarded refractory or a high temperature, an electric heater grid system of elongated heater elements is installed. The electric heater elements are designed for rapid rise in temperature, for example in a period of 5 to 15 minutes to provide flame port temperatures in the order of 1300° F. more or less depending on operating conditions. The elongated electric heater elements, which can be arranged either vertically or horizontally or as a grid system, provide an extremely rapid rise high temperature heating element to facilitate the combustion of waste materials and gases and particulates and further serves as an impingement screen to provide for settling of incombustible particulates. The electric heater system can be used with or without checkerboard refractory in the flame ports and provides an improved and efficient means for incinerating industrial, commercial or agricultural waste material and minimizes air pollution.

The patent to Lincot et al. discloses a process for depositing a film of a metal oxide or that of a metal hydroxide on a substrate in an electrochemical cell, wherein (i) the metal hydroxide is of formula $M(OH)_xA_y$, M representing at least one metallic species in an oxidation state i chosen from the elements in Groups II and III of the periodic Table, A being an anion whose number of charges n, $0<x$ I and $x+ny=I$, (ii) the electrochemical cell comprises (a) an electrode, comprising the substrate, (b) a counter-electrode, (c) a reference electrode and (d) an electrolyte comprising a conducting solution comprising at least one salt of the metal M, the process comprising the steps of: dissolving oxygen in the electrolyte and imposing a cathode potential of less than the oxygen reduction potential and greater than the potential for deposition of the metal M in the electrolyte in question on the electrochemical cell.

It should be understood that the present invention would in fact enhance the functionality of the above patents as follows: In contrast to the aforementioned patents, the intent of the present invention is not to produce a protective oxide coating on the surface of a metal such as aluminum but instead to prevent or reduce one such oxide coating from forming. In a semi-fuel cell (SCF), aluminum reacts with an alkaline solution such as sodium hydroxide to form an unwanted aluminum oxide layer. Since this oxide layer inhibits the electrochemical reactivity of the aluminum resulting in lower semi-fuel cell efficiency, it must be eliminated or minimized. The invention described herein utilizes a specific ternary compound, sodium gallate ($AnGaO_2$) that will dissolve in alkaline electrolytes and in the presence of aluminum metal will prevent an oxide coating from forming on the surface of the aluminum.

SUMMARY OF THE INVENTION

Therefore it is an object of this invention to provide an electrolyte additive for aluminum anode activation.

Another object of this invention is to provide an electrolyte additive for aluminum anode activation in which the additive prevents or reduces formation of an oxide coating on a surface of a metal.

Still another object of this invention is to provide an electrolyte additive for aluminum anode activation in which the additive is sodium gallium oxide.

In accordance with one aspect of this invention, there is provided an additive for an aluminum-based semi-fuel cell system includes a combination of components including gallium, oxygen, and a sodium component dissolvable an alkaline electrolyte solution such as seawater and sodium hydroxide. These components form sodium gallium oxide and prevent formation of an oxide layer on a surface of an aluminum anode in the alkaline electrolyte of the semi-fuel cell system.

DESCRIPTION OF THE PREFERRED EMBODIMENT

In general, the present invention is directed to a new electrolyte additive, sodium gallium oxide ($NaGaO_2$), intended for use an as activator in aluminum-based semi-fuel cell (Al-SFC) systems.

Sodium gallium oxide, when dissolved in the caustic solution of the aluminum based semi-fuel cell, produces FA (III) ions that prevent or inhibit the formation of an oxide layer on the surface of the aluminum anode. Since the formation of surface oxide is detrimental to the performance and efficiency of the aluminum based semi-fuel cell it must be eliminated or minimized.

This invention describes the use of a sodium gallium oxide ($NaGaO_2$) as an electrolyte additive in aluminum based semi-fuel cell systems. Although sodium gallium oxide is not available as an off-the-shelf reagent, it can be easily prepared by the solid state reaction:

sodium oxalate+gallium oxide 1200° C., sodium gallium oxide+carbon dioxide

Sodium gallium oxide ($NaGaO_2$) is dissolved in the seawater/sodium hydroxide electrolyte in the anode compartment of the aluminum based semi-fuel cell. The concentration of the $NaGaO_2$ ranges from 1.0 e-5 M to 3.0 e-5 M; whereas M is molarity and 5M indicates the concentration of $NaGaO_2$ to be five times its molecular weight in grams (one mole) per liter of solution. The anode consists of pure aluminum (purity, 99.99% to 99.999%) and sodium tin oxide (0.01 M to 0.03 M). [It should be noted that concentration of solution as that $NaGaO_2$ is defined in terms of M, molarity which is indicated by molarity, M].

The use of $NaGaO_2$ as an electrolyte additive allows less expensive, readily available aluminum metal to be used as the anode material in aluminum based semi-fuel cells. The major advantage of sodium gallium oxide is its solubility in caustic, electrolytes. Unlike gallium oxide ($Ga_2O_3$), which has a limited solubility, sodium gallium oxide dissolves completely allowing its exact concentration in solution to be determined. Other advantages are that the sodium gallium oxide is in its solid powder form at room temperature, is stable in air, and has no special storage requirements.

Additional compounds which could also find applications as electrolyte additives for aluminum based semi-fuel cells include $NaGa_3O_8$, $KGa_5O_8$, $KGa_{11}O_{17}$, $Ga(NO_3)_3$.

In view of the above detailed description, it is anticipated that the invention herein will have far reaching applications other than those of aluminum based semi-fuel cells.

This invention has been disclosed in terms of certain embodiments. It will be apparent that many modifications can be made to the disclosed apparatus without departing from the invention. As an example, any of the above-mentioned additives can be prepared by different methods for use to prevent or reduce the formation of an oxide layer on the aluminum anode surface. Therefore, it is the intent of the appended claims to cover all such variations and modifications as come within the true spirit and scope of this invention.

What is claimed is:

1. An additive for an aluminum based semi-fuel cell system comprising:
    sodium gallate to prevent formation of an oxide layer on a surface of an aluminum anode in an alkaline electrolyte of said semi-fuel cell system.

2. The additive according to claim 1 wherein said sodium gallate is dissolvable in the alkaline electrolyte.

3. The additive according to claim 1 wherein sodium gallate is obtained from the following:
    sodium oxalate+gallium oxide 1200° C., sodium gallium oxide+carbon dioxide.

4. The additive according to claim 1 wherein the alkaline electrolyte of the semi-fuel cell system includes a reaction product of aluminum with an alkaline solution.

5. The additive according to claim 4 wherein the aluminum is elemental aluminum.

6. The additive according to claim 4 wherein the aluminum is an aluminum alloy.

7. A process for preventing formation of an oxide layer on a surface of an aluminum anode in an aluminum based semi-fuel cell system comprising the steps of:

(a) forming an alkaline electrolyte solution in an anode compartment of said semi-fuel cell system; and (b) introducing sodium gallate into said alkaline solution.

8. The process according to claim 7 wherein said sodium gallate is dissolvable in the alkaline electrolyte.

9. The process according to claim 7 wherein sodium gallate is obtained from the following: sodium oxalate+gallium oxide 1200° C., sodium gallium oxide+carbon dioxide.

10. The process according to claim 7 wherein the alkaline electrolyte of the semi-fuel cell system includes a reaction product of aluminum with an alkaline solution.

11. The process according to claim 10 wherein the aluminum is elemental aluminum.

12. The process according to claim 10 wherein the aluminum is an aluminum alloy.

13. The additive according to claim 4 wherein said alkaline solution is sodium hydroxide.

14. The process according to claim 10 wherein said alkaline solution is sodium hydroxide.

* * * * *